United States Patent
Andrus (10) Patent No.: US 6,502,675 B1
(45) Date of Patent: Jan. 7, 2003

(54) INTEGRATED HANDLEBAR AND MASTER CYLINDER HAVING PISTON AND HYDRAULIC LINE COAXIALLY ALIGNED WITH MAJOR CENTRAL AXIS OF HANDLEBAR

(76) Inventor: Frank G. Andrus, 6601 Storer Ave., Cleveland, OH (US) 44102

( * ) Notice: Subject to any disclaimer, the term of this patent is extended or adjusted under 35 U.S.C. 154(b) by 0 days.

(21) Appl. No.: 09/758,827

(22) Filed: Jan. 11, 2001

Related U.S. Application Data
(60) Provisional application No. 60/175,537, filed on Jan. 11, 2000.

(51) Int. Cl.[7] .................................................. B60T 11/00
(52) U.S. Cl. ........................................................ 188/344
(58) Field of Search ........................ 188/24.16, 151 R, 188/344, 345, 359, 489; 74/491; 60/550, 594

(56) References Cited

U.S. PATENT DOCUMENTS

| | | |
|---|---|---|
| 4,501,340 A | 2/1985 | Yoshida |
| 4,921,081 A | 5/1990 | Chilcote |
| 5,464,239 A | 11/1995 | Gajek et al. |
| 5,476,162 A | 12/1995 | Reed et al. |
| 5,538,270 A | 7/1996 | Gajek et al. |
| 5,615,753 A | 4/1997 | Wang |
| 6,209,687 B1 * | 4/2001 | Hundley .................. 188/24.16 |
| 6,227,342 B1 * | 5/2001 | Armbruster et al. ...... 192/85 R |

* cited by examiner

Primary Examiner—Christopher P. Schwartz
(74) Attorney, Agent, or Firm—Fay, Sharpe, Fagan, Minnich & McKee, LLP (57) ABSTRACT

An integrated handlebar extension and master cylinder apparatus for use on the handlebar of an associated motorcycle is provided. The integrated handlebar extension and master cylinder apparatus includes a main body member with a connection interface for selectively connecting the apparatus onto the handlebars of an associated motorcycle. A master cylinder unit is formed integrally with the main body member and has an elongate bore defining a first longitudinal axis. A piston is disposed within the bore and is slidable relative to the master cylinder unit along the first longitudinal axis. A trigger member is pivotably movable relative to the master cylinder unit and is adapted on a first end to receive an actuation force and on a second end to cause relative movement between the master cylinder unit and the piston in response to the actuation force. A handlebar portion extends along said first longitudinal axis on a side of said main body member opposite from said connection interface.

44 Claims, 11 Drawing Sheets

INTEGRATED HANDLEBAR AND MASTER CYLINDER HAVING PISTON AND HYDRAULIC LINE COAXIALLY ALIGNED WITH MAJOR CENTRAL AXIS OF HANDLEBAR

CROSS-REFERENCE TO RELATED APPLICATION

This application claims the benefit of U.S. Provisional Application Ser. No. 60/175,537 filed Jan. 11, 2000.

BACKGROUND OF THE INVENTION

The present invention is directed to the art of hydraulic master cylinder devices of the type adapted for manual actuation and, more particularly, to hydraulic hand brake apparatus. The present invention is particularly well suited for use in motorcycle hand brake and hydraulic clutch operations and will be described with particular reference thereto. However, it is to be appreciated that the present invention can be applied in a wide range of applications such as in the bicycle arts, motorized vehicle arts, or anywhere pressurized fluids are used to control one or more devices such as brakes, clutches or the like. Accordingly, the invention is not limited to the preferred embodiments described in detail below.

Figures 1, 2, 3:
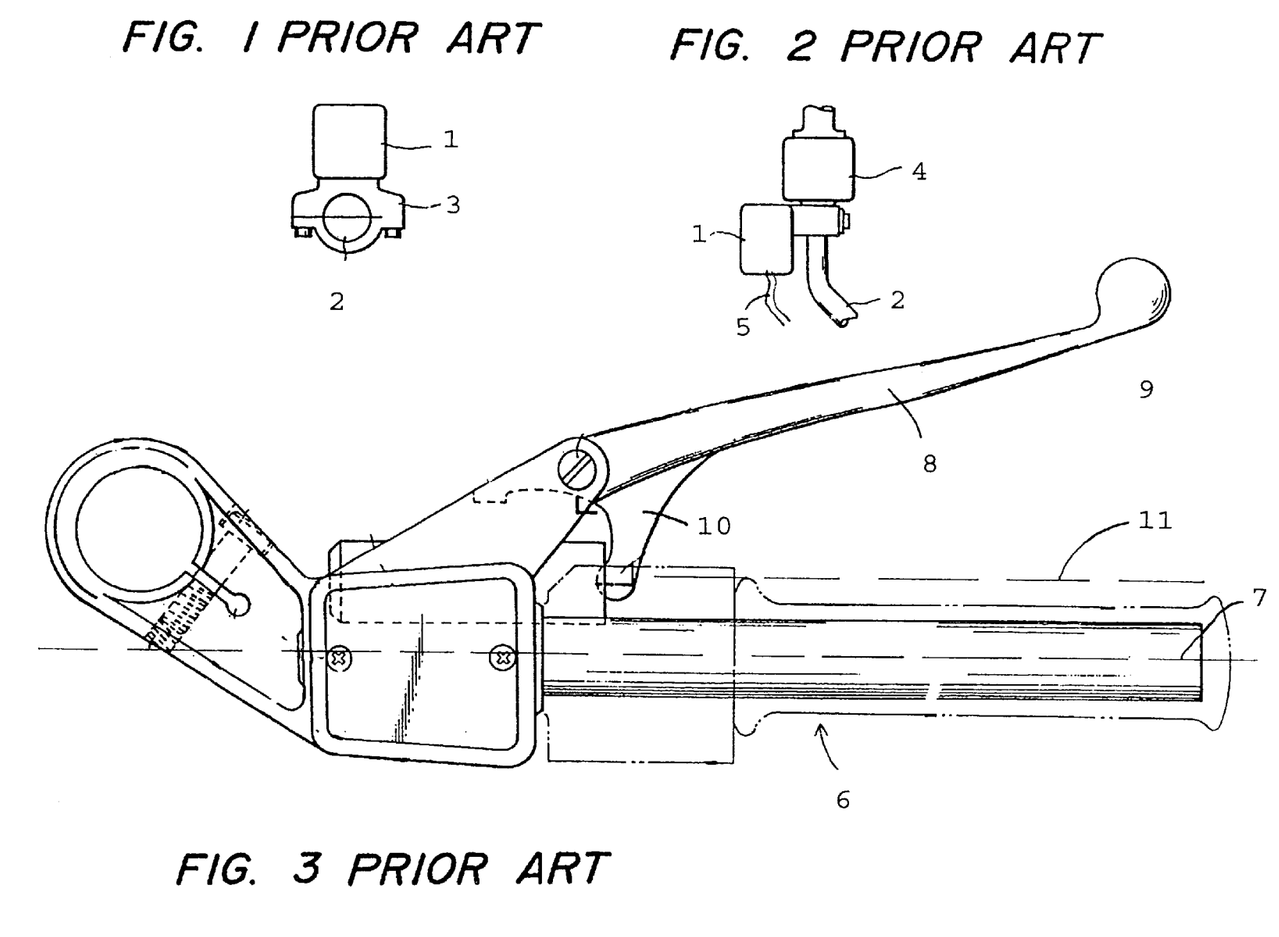
FIG. 1 is a front elevational view showing a conventional master cylinder disposed relative to a handlebar.
FIG. 2 is a top plan view showing another conventional master cylinder relative to a handlebar.
FIG. 3 is a top plan view showing another type of conventional master cylinder that is partially connected to the handlebar which is in turn attached to an associated motorcycle fork tube.

Drawings showing examples of prior art hydraulic master cylinders for use with motorcycles are shown in FIGS. 1–3. Generally, the hydraulic master cylinders have an integral piston adapted to be actuated by a lever provided adjacent to a handle grip which is positioned in a spaced apart relationship relative to motorcycle handlebars. FIG. 1 shows an end view of a master cylinder 1 mounted on the handlebar 2 using a bracket 3. FIG. 2 shows a master cylinder 1 positioned alongside of the handlebar 2 and a handle switching unit 4 mounted on the handlebar 2 coaxially therewith. A hydraulic line 5 extends from the master cylinder 1 in a spaced apart relationship relative to the handlebar 2 substantially as shown.

One disadvantage with typical prior art master cylinder devices is that they are constructed in a manner to provide little or no protection to the hydraulic fluid lines extending between the master cylinder and the actuation device. More particularly, as best illustrated in FIG. 2, the brake line 5 extends from the master cylinder 1 generally alongside the handlebar 2 in a substantially unprotected and rather vulnerable position. More particularly, as those skilled in the motorcycle or bicycle arts can appreciate, brake lines such as hydraulic fluid lines or cables often snag on clothing or other articles causing a potentially dangerous situation. Further, the generally unprotected nature of the brake lines 5 renders them vulnerable to severe mechanical damage, such as rupture, kinking, or the like, when they are exposed to excessive force or impact. This poses a particular problem in connection with high performance motorcycles and with motorcycles built for racing.

In addition to the above, another concern with prior art master cylinder and brake line arrangements is primarily aesthetic in nature. More particularly, external brake lines are not visually appealing. On some motorcycles, the brake lines are chrome plated or wire braided to provide a pleasant appearance. Even so, the external brake line routing detracts from the overall visual impact of the motorcycle. This is particularly true in custom motorcycles where external brake lines detract from the appearance of highly detailed frames, engines and other parts.

Another disadvantage with prior art motorcycle hydraulic master cylinder apparatus will be described below in connection with reference to FIG. 3. As shown there, a handlebar 6 defines a major central longitudinal axis 6. During use of the device shown in FIG. 3, a motorcycle operator places his palm onto the handlebar portion 6 and extends the forefingers around a trigger member 8. By squeezing on the trigger portion 8, rotation is established in the direction labeled by the arrow 9 in the Figure. An actuation foot member 10 moves together with the grip portion 8 substantially along a line 11 parallel to the major central axis 7 of the handlebar portion 6. In the configuration shown in FIG. 3, a piston (not shown) contained within the hydraulic master cylinder is linearly slidable along the line 11 substantially parallel but offset from the major access axis 7 of the handlebar portion.

One disadvantage with the system shown in FIG. 3 is that the piston within the master cylinder is slidable along an axis offset from the major axis of the handlebar portion. Accordingly, the overall hydraulic master cylinder system is generally bulky and therefore has a reduced aesthetic appeal. In addition to unnecessarily consuming space, the relative offset between the axis 11 defined by piston actuation and the hand grip portion 7 results in a mechanical disadvantage to the motorcycle rider.

In accordance with the above, therefore, it is desirable to provide an integrated handlebar and master cylinder having a piston and hydraulic line coaxially aligned with the central axis of the handlebar. Preferably, the piston is slidable along an axis coaxial and coincident with the major central axis of the hand grip portion of the motorcycle handlebar.

It would further be desirable to provide an integrated handlebar and master cylinder apparatus adapted for attachment to an associated handlebar, the master cylinder having a piston movable along an axis coaxial with an axis defined by the handlebar portion. Preferably, the axis defined by the handlebar portion together with the axis defined by the piston within the master cylinder is coaxial and coincident with the axis defined by the associated handlebar.

It would be desirable to provide a system such as described above so that a mechanical advantage is realized during manual actuation of the subject system.

Further, it would be desirable to provide a system such as described above to enable the routing of hydraulic brake lines or the like directly from the master cylinder and through at least the handlebar and top triple tree portions of a motorcycle. This simultaneously protects the brake lines from damage and is aesthetically pleasing.

SUMMARY OF THE INVENTION

The subject invention provides an integrated handlebar and master cylinder apparatus having a slidable piston and a hydraulic line both of which being coaxially aligned with the major central axis of a hand grip portion of the handlebar. The position of the piston within the subject system enables the piston to be linearly slidably directly along and coincident with the major central axis of the handlebar.

In addition, the subject invention provides an integrated handlebar and master cylinder device that includes a hydraulic line extending from the master cylinder substantially along an axis coaxial with and coincident with the major central axis of the handlebar. In that way, the hydraulic line is adapted for direct routing within the central cavity of the handlebar and motorcycle fork assemblies. This simultaneously provides protection to the hydraulic lines together with an improved aesthetic appearance.

BRIEF DESCRIPTION OF THE DRAWINGS

The invention may take physical form in certain parts and arrangements of parts, the preferred embodiments of which will be described in detail in this specification and illustrated in the accompanying drawings which form apart hereof and wherein.

DETAILED DESCRIPTION OF THE PREFERRED EMBODIMENTS

Figure 4:
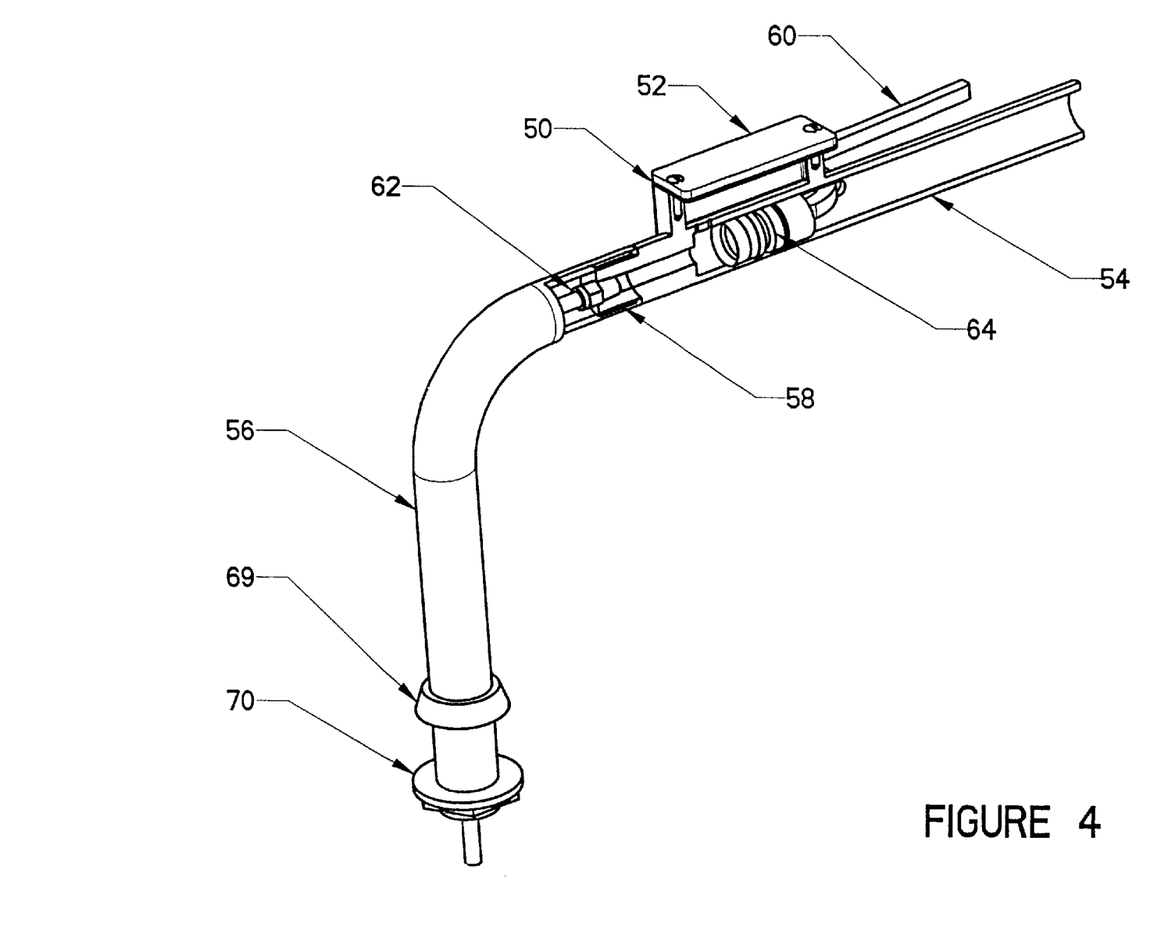
FIG. 4 is a perspective view of an integrated handlebar and master cylinder apparatus formed in accordance with a first preferred embodiment of the subject invention.

Referring now to the drawings wherein the showings are for the purposes of the illustrating the preferred embodiments of the invention only and not for purposes of limiting same, the overall arrangement of the preferred form of an integrated handlebar and master cylinder apparatus formed in accordance with the invention can best be seen with reference first to FIG. 4. As shown there, the subject integrated handlebar and master cylinder device 50 includes a brake master cylinder portion 52, formed integrally with a hand grip portion 54 adapted for direct connection onto an associated handlebar section 56 through a threaded interface 58. As can be seen, an actuating lever 60 extends from the subject system 50 and is pivotably attached thereto in a manner well known in the art. A hydraulic brake line 62 extends from the master cylinder portion 52 and hand grip portion 54 substantially coaxially with and coincident with the major central axis 62 defined by the hand grip portion 54 and the associated handlebar section 56. In addition, as shown in FIG. 4, a hydraulic piston 64 is linearly slidably within a cylindrical sleeve of the master cylinder along the major central axis 64 of the handlebar section 56 and the hand grip portion 54.

Figure 5:
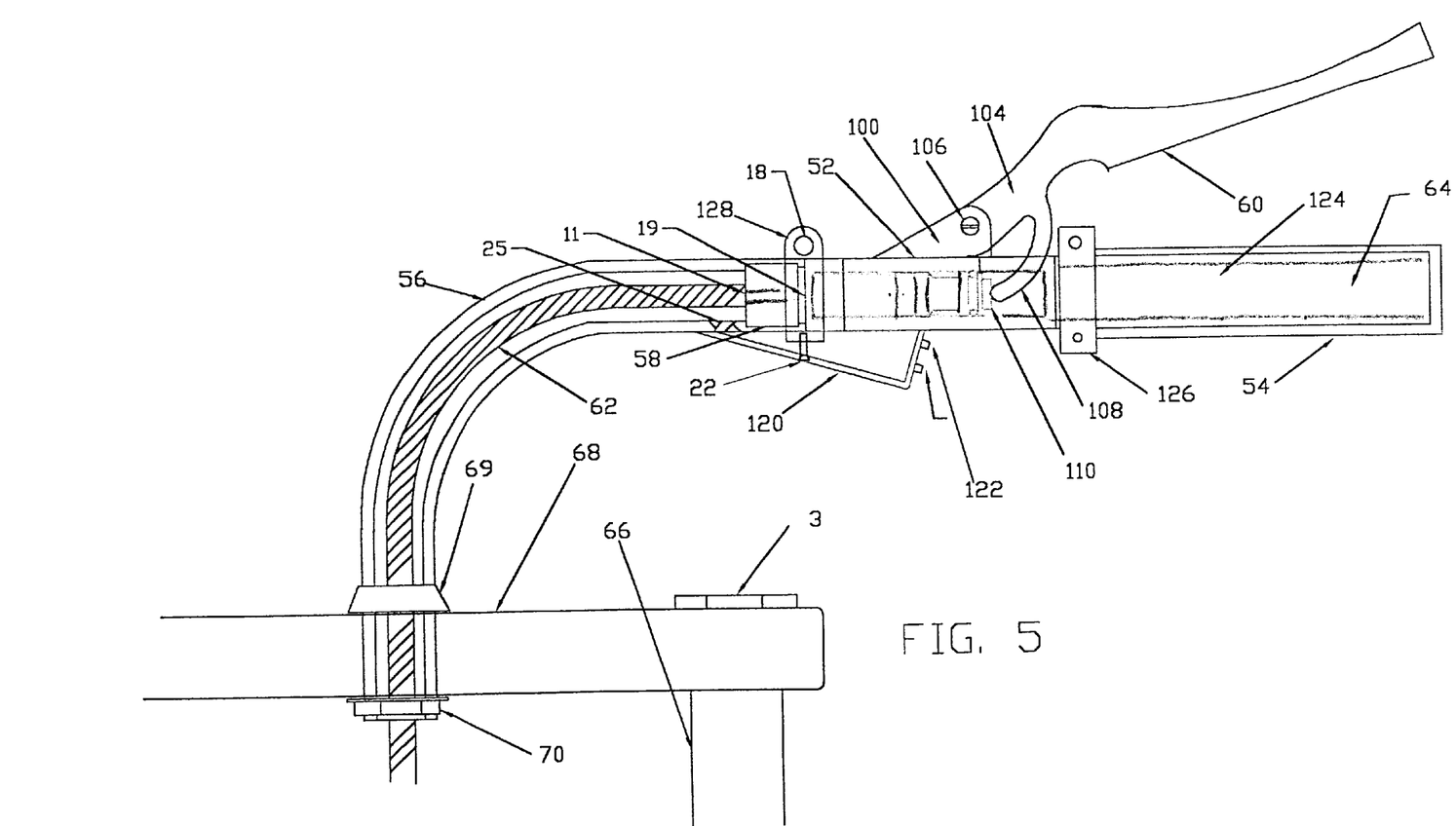
FIG. 5 is a top plan view in partial cross section showing the internal and external working parts of the subject invention and including an electric switch unit in accordance with a second preferred embodiment of the invention.
Figure 6:
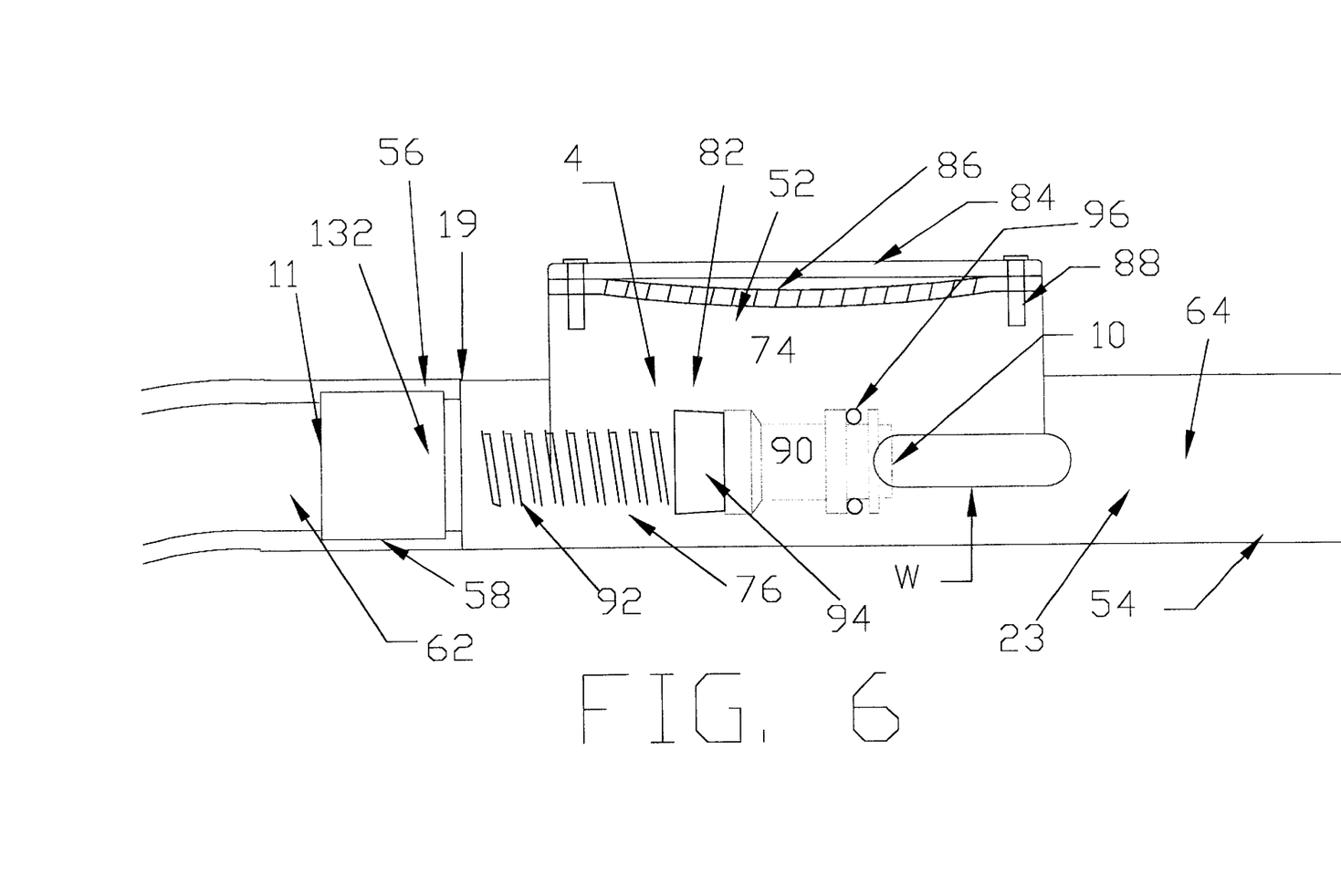
FIG. 6 is a side elevational view in partial cross section showing the internal working components of the master cylinder portion in accordance with the preferred embodiments of the invention.

With reference next to FIGS. 5 and 6 of the drawings, there are shown a more detailed views of the first embodiment of the invention. Associated motorcycle portion shown fragmentarily in FIG. 5 includes a pair of transversely mounted fork tubes of which only the righthand fork tube 66 is shown in FIG. 5. The front forks are secured integrally to a top bridge shown at 68 in FIG. 5. A handlebar 56 is fitted with a collar member 69 welded in place. A first lower end of the handlebar is externally threaded for a washer face nut 70. After the handlebar is placed through a suitable receiving hole formed in the top bridge shown at 2 in FIG. 5, the washer face nut 70 is tightened to secure the handlebar in the position shown. The handlebar is internally threaded on the opposite or upper end to accept the subject device 50 of the invention at a threaded interface 72.

A more detailed view is shown in FIG. 6. A brake master cylinder 52 has a body formed integrally with a hand grip portion 54 by casting or machining from billet material. The body 52 has a upper portion, which defines an oil reservoir 74 and a lower portion which defines a cylindrical chamber 76 adjacent to the front end thereof. The reservoir 74 and the chamber 76 are in fluid communication with each other by ports 80 and 82. A cover member 84 having a flexible diaphragm 86 attached thereto is secured to the top of the reservoir 74 by any suitable means, preferably using screws 88. The diaphragm 86 is vertically movable in response to changes in the quantity of oil in the reservoir 74 to maintain a constant pressure in the reservoir.

A master cylinder piston 90 is linearly slidably positioned in the cylindrical chamber 76. As shown, the piston 90 is linearly slidable along an axis coaxial with and coincident with the major central axis 64 defined by the handlebar 56 portion and the hand grip portion 54. A return spring 92 is provided in the cylindrical chamber 76 between the bottom thereof and the piston 90. A seal cap 94 is disposed between the piston 90 and the spring 92 to maintain oil tightness in the cylindrical chamber 76. The piston 90 is provided with a radially outwardly projecting flange opposite the seal cap 94 end of the piston. A seal ring 96 is disposed inwardly of the flanges in contact with the piston and the peripheral wall of the cylindrical chamber 76.

Figure 7:
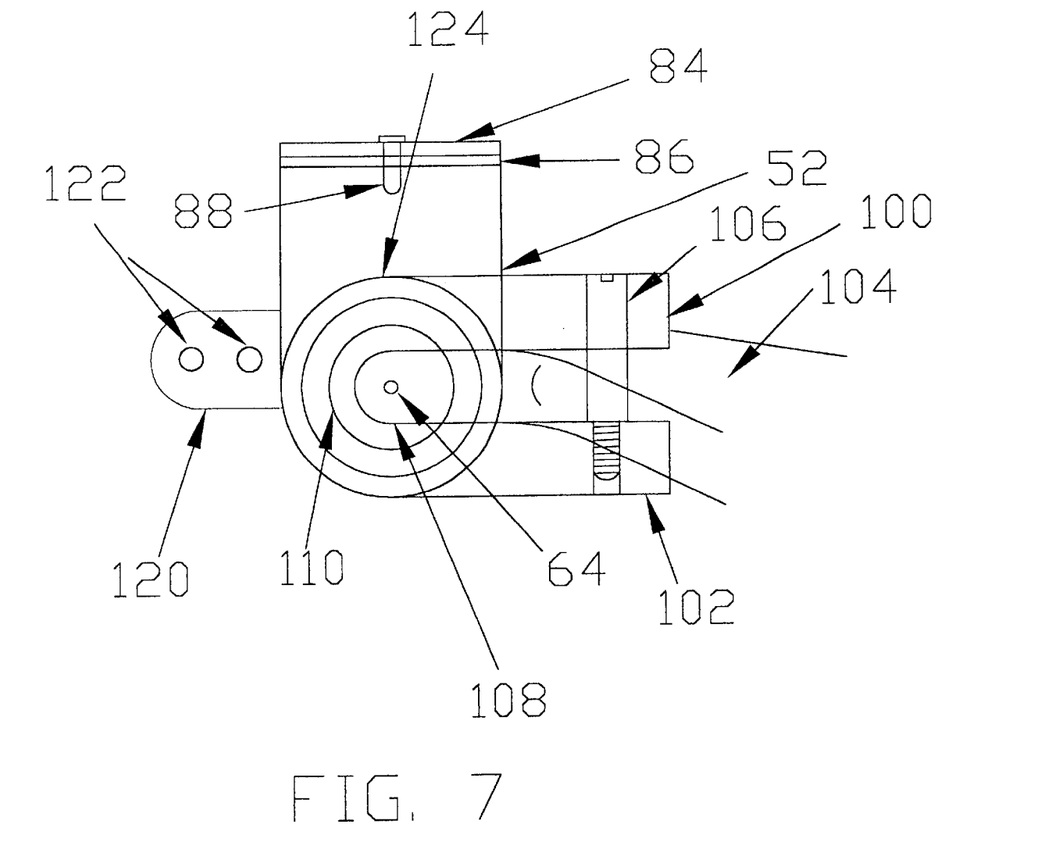
FIG. 7 is an end elevational view showing actuation lever mount components and electrical switch box configuration in accordance with the preferred embodiments of the invention.

With reference now to FIGS. 5 and 7, bracket upper and lower portions 100, 102 are provided on one side of the body 52 and are preferably integrally formed with the body 52 as illustrated. An actuating lever 60 has a base portion 104 which is rotatably or pivotably connected to the bracket 100, 102 by suitable pin or bolt means 106 which is threaded preferably directly into the lower bracket 102 (FIG. 7). The lever 60 has a pressing leg 108 which projects from its base portion 104 and which is in abutment against the pressing area 110 of the piston 90.

Figure 8:
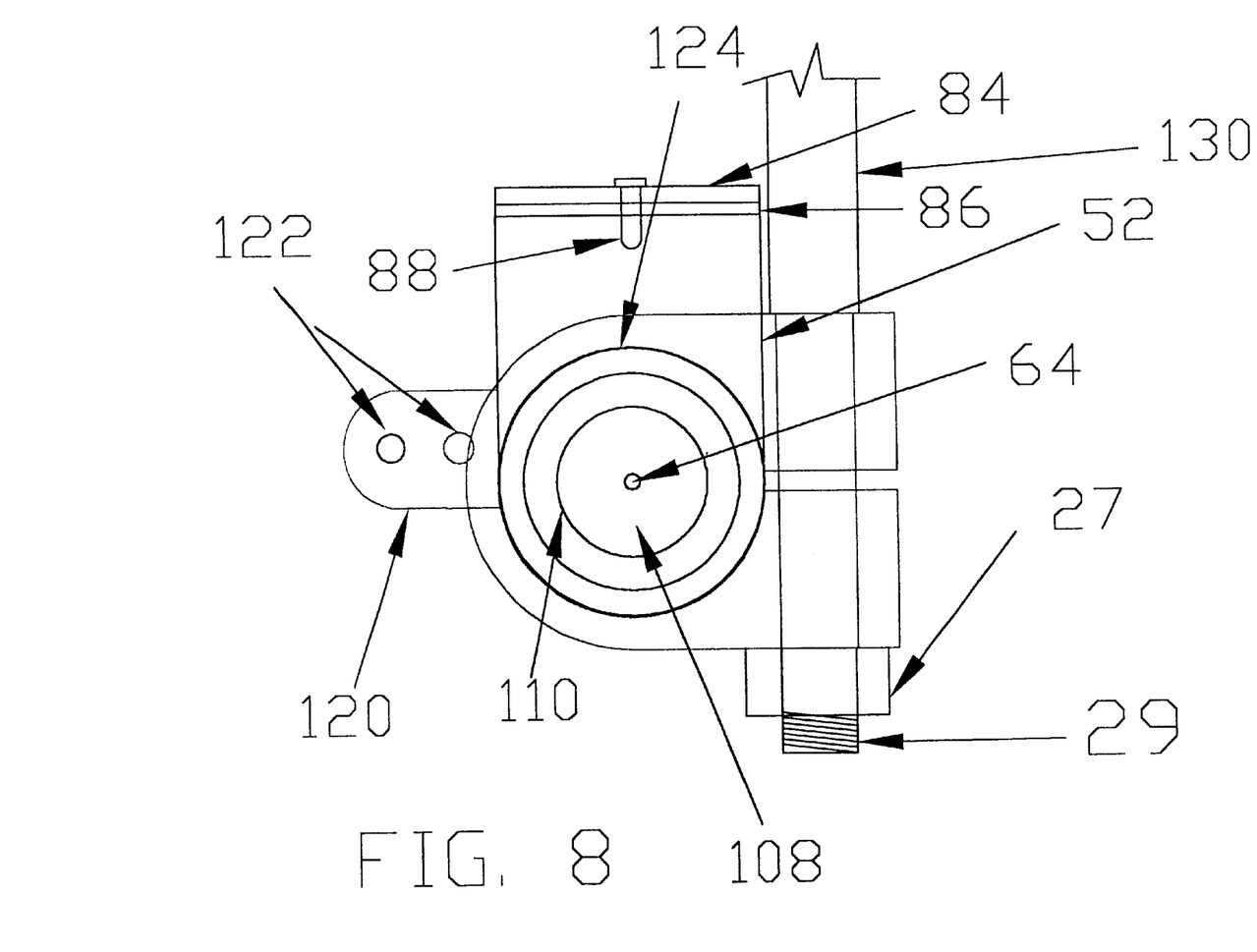
FIG. 8 is an end elevational view showing the electric switch box and clamp assembly with lever mounts omitted for clarity.
Figure 9:
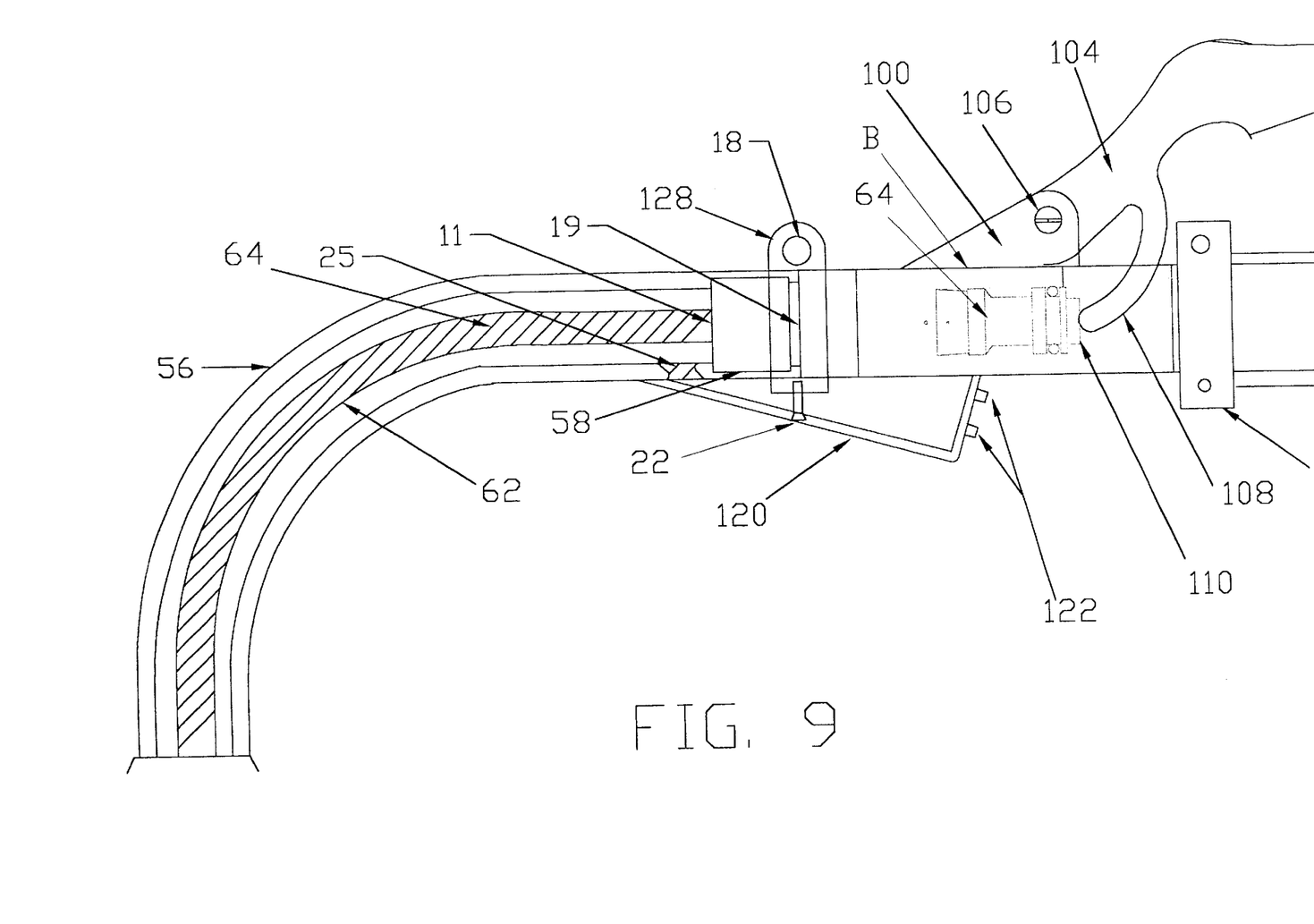
FIG. 9 is a top plan view in partial cross section showing the electrical switch box, clamp assembly, and lever configuration in accordance with a second preferred embodiment of the invention.
Figure 10:
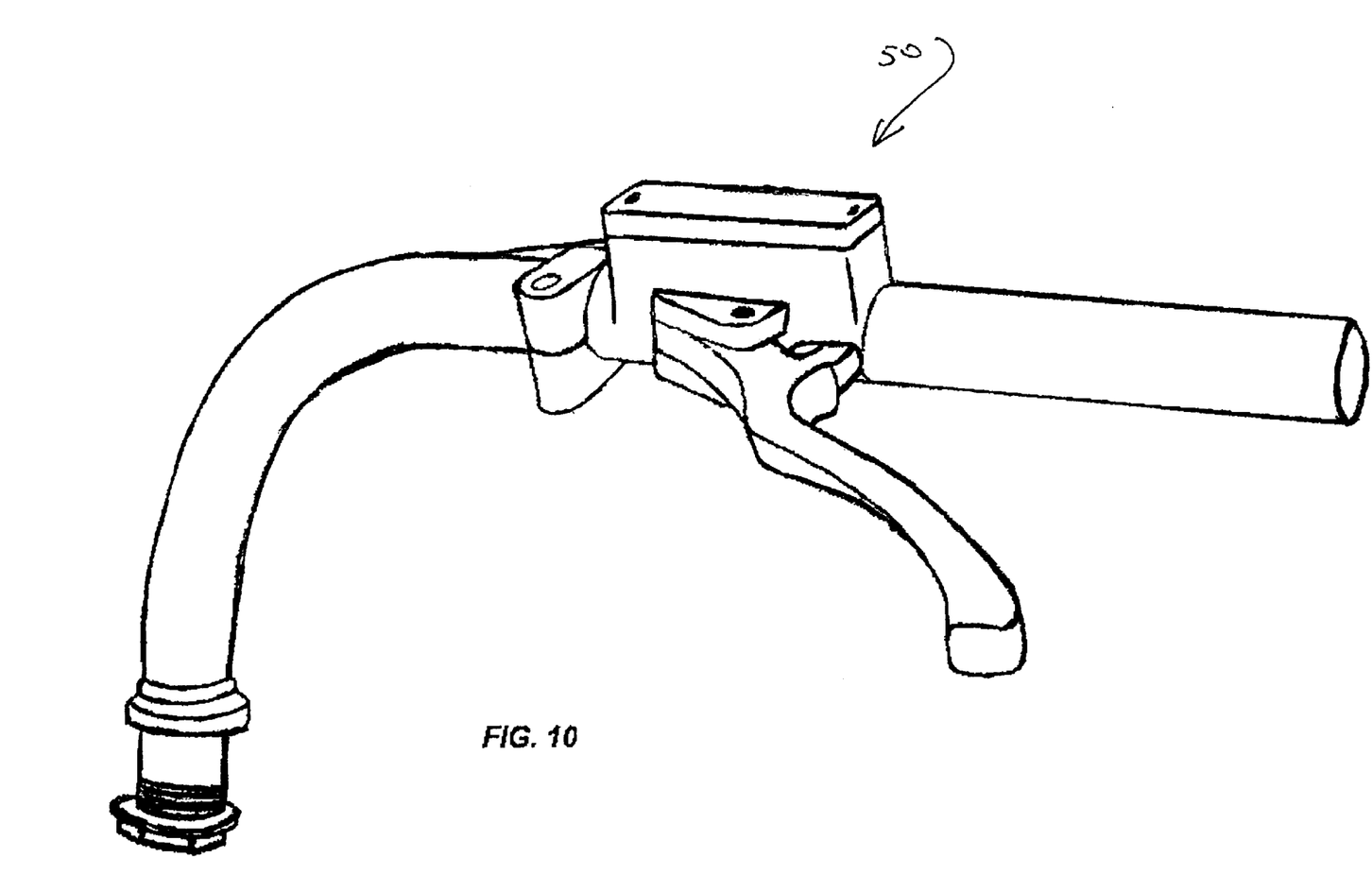
FIG. 10 is a front perspective view of the subject invention installed onto an associated motorcycle handlebar portion.
Figure 11:
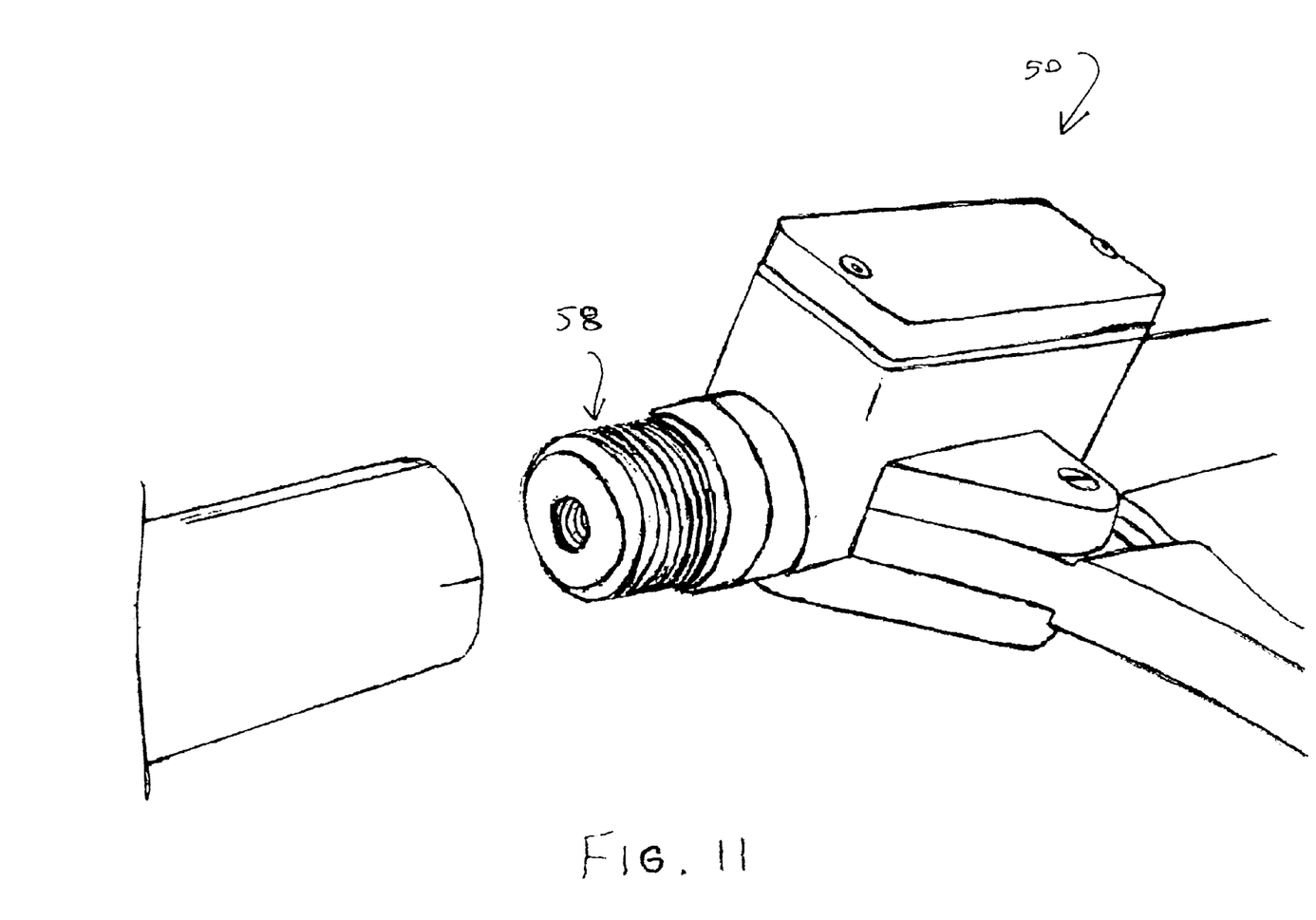
FIG. 11 is a perspective view of the subject invention in a position and orientation prior to installation onto an associated motorcycle handlebar portion and showing the preferred threaded interface portion of the invention.
Figure 12:
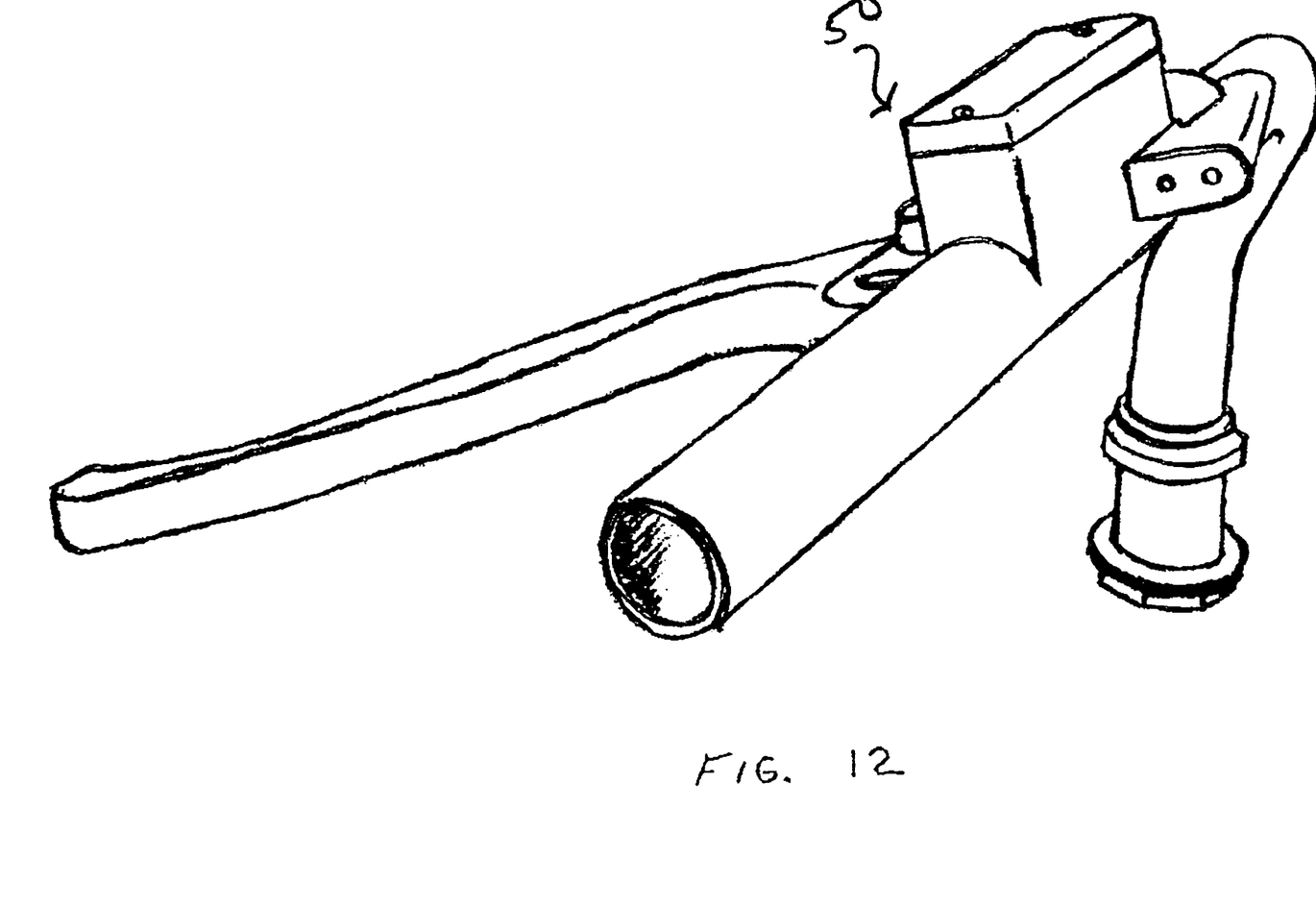
FIG. 12 is a side perspective view of the subject invention installed onto an associated motorcycle handlebar showing the forward electrical switch box construction used with the second preferred embodiment of the invention; and, FIG. 13 is a rear elevational view of the apparatus shown in FIG. 12 illustrating the position of the electrical switch box in accordance with the second preferred embodiment.
Figure 13:
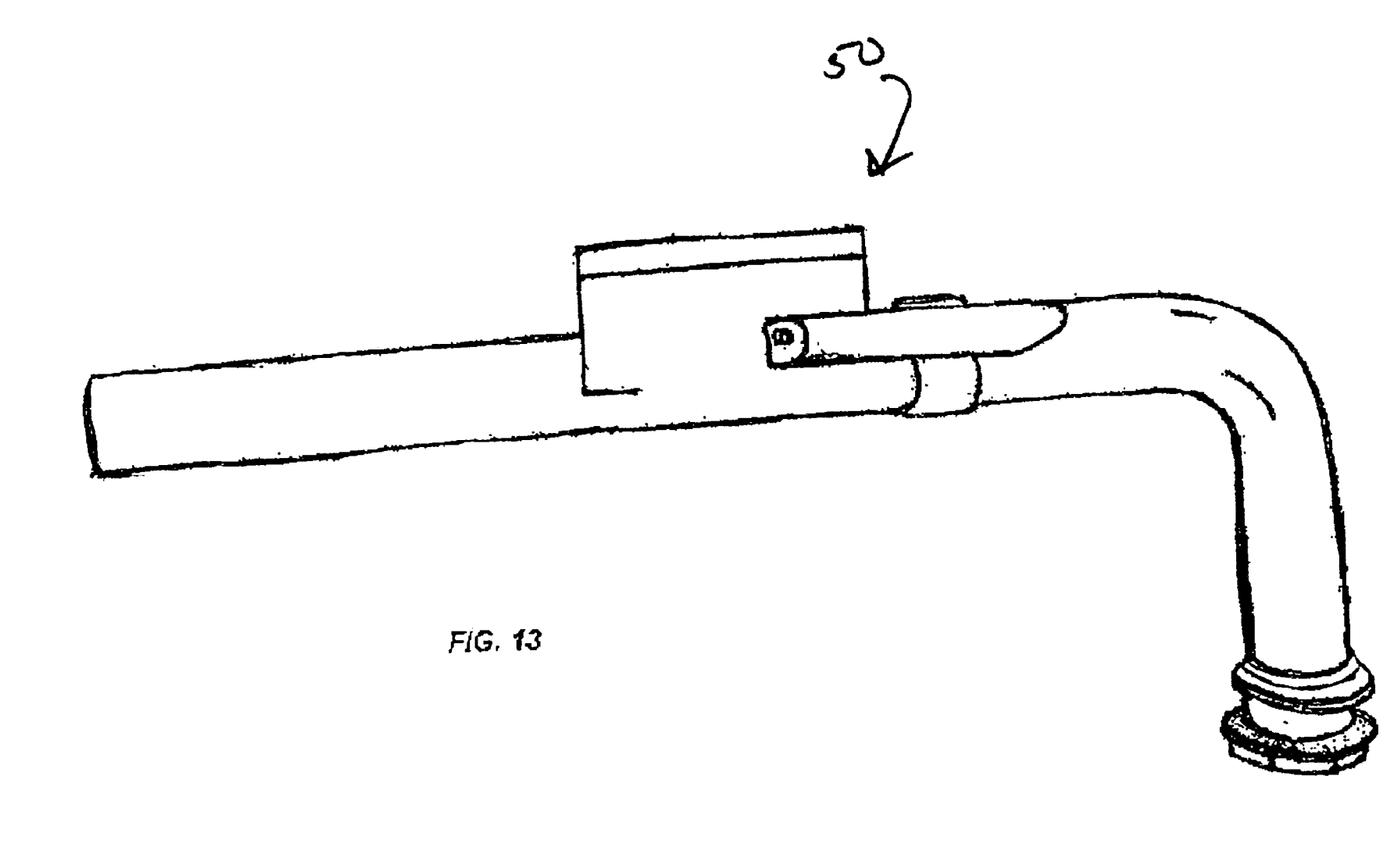

A handle switching unit 120 contains an electrical switch for a turn signal and a starter switch 122. The handle switching unit 120 is mounted on the handlebar/master cylinder adjacent to the master cylinder 52 as shown in FIGS. 5, 7, 8. An integral handlegrip 54 is provided on the free end of the hand grip portion 124 as shown in FIG. 5. Space is provided for a throttle assembly 126 on one unit as shown in FIG. 5.

A clamp 128 shown in (FIGS. 5, 7, 8) for securing the master cylinder 52 to the handlebar 56 is provided to lock the master cylinder in place after it is threaded into the handlebar. The clamp is slid onto the handlebar before the master cylinder is fastened onto the handlebar and connected to the hydraulic split line 62 as shown in FIGS. 5, 6. The clamp is then tightened down with a bolt or a mirror stem 130, shown in FIG. 8.

The port 80 (FIG. 6) defines an orifice through which oil is supplied from the reservoir 74 into the cylinder chamber 76. The port 82 which is provided adjacent to the port 80, defines a relief port which serves to relieve the pressure of the oil in the reservoir 74 and the pressure of the oil in the cylinder chamber 76.

When the boot portion 108 of lever 60 is depressed against master cylinder piston area 110 (FIGS. 5, 7) by pivotal motion of the lever about the bolt 106, the piston 90 is urged into slidable motion along the axis 64 to force the oil (not shown) in chamber 76 through passage 132 FIG. 6, and through the hydraulic line 62, threaded into master cylinder unit at 134 as shown in FIG. 6, to an associated brake or clutch assembly (not shown).

A right hand unit is shown and is usually used in motorcycle applications for the brake assembly. Typically, two master cylinder units of the type described are used per motorcycle. The left hand assembly is used to operate clutch hydraulics and is a mirror image of the right hand assembly in all aspects except for the master cylinder piston assembly which is smaller in diameter for more hydraulic power and less needed travel. Also, these controls may be threaded into many styles of handlebars. With this invention, the controls are compact in size and hide the hydraulic lines while protecting them.

The invention has been described with reference to the preferred embodiments. Obviously, modifications and alterations will occur to others upon a reading and understanding of this specification. It is intended to include all such modifications and alterations. As an example, in one such modification, the subject invention is adapted for integration into a motorcycle foot peg for foot operated brake controls. In that embodiment of the subject invention, and integrated foot peg and master cylinder apparatus is provided having a piston and hydraulic line coaxially aligned with the major central axis of a motorcycle foot peg.

Having thus described the invention, it is claimed:

1. An apparatus for use with an associated handlebar defining a handlebar longitudinal axis, the apparatus comprising:
    a connection interface for selectively connecting the apparatus with the associated handlebar of the associated device;
    a master cylinder unit having an elongate bore defining a first longitudinal axis substantially coaxially aligned with said handlebar longitudinal axis;
    a piston disposed within said bore and slidable relative to said master cylinder unit along said first longitudinal axis;
    a trigger member pivotable relative to said master cylinder unit, the trigger member being adapted on a first end to receive an actuation force and on a second end to cause relative movement between said master cylinder unit and said piston in response to said actuation force; and,
    a hand grip portion extending along said first longitudinal axis.

2. The apparatus according to claim 1 wherein the connection interface, master cylinder unit, and handlebar portion are integrally formed in a single construction.

3. The apparatus according to claim 2 wherein said hand grip portion extends along said first longitudinal axis from said single construction on a side of said master cylinder unit opposite from said connection interface.

4. The apparatus according to claim 2 further including a switch unit integrally formed with said single construction, said switch unit including at least one electrical switch for actuating an associated electrical device.

5. The apparatus according to claim 1 wherein said trigger member is pivotable about an axis substantially perpendicular to said first longitudinal axis.

6. The apparatus according to claim 1 wherein:
    said hand grip portion of the apparatus defines a second longitudinal axis; and,
    the handlebar longitudinal axis is coincident with said second longitudinal axis.

7. The apparatus according to claim 1 wherein said connection interface includes an attachment area coincident with said first longitudinal axis for selective attachment to an associated hydraulic line member of the associated device.

8. The apparatus according to claim 1 wherein:
    said hand grip portion defines a second longitudinal axis; and,
    the first longitudinal axis of the master cylinder unit is coincident with said handlebar longitudinal axis and said second longitudinal axis.

9. An apparatus for use with an associated handlebar of an associated device, the associated handlebar defining a handlebar longitudinal axis, the apparatus comprising:
    a connection interface for selectively connecting the apparatus with the associated handlebar of the associated device;
    a master cylinder unit having an elongate bore defining a first longitudinal axis, said first longitudinal axis of said master cylinder unit being coincident with said handlebar longitudinal axis;
    a piston disposed within said bore and slidable relative to said master cylinder unit along said first longitudinal axis;
    a trigger member pivotable relative to said master cylinder unit, the trigger member being adapted on a first end to receive an actuation force and on a second end to cause relative movement between said master cylinder unit and said piston in response to said actuation force; and,
    a hand grip portion extending along said first longitudinal axis.

10. The apparatus according to claim 9 wherein the connection interface, master cylinder unit, and hand grip portion are integrally formed in a single construction.

11. The apparatus according to claim 10 wherein said hand grip portion extends along said first longitudinal axis from said single construction on a side of said master cylinder unit opposite from said connection interface.

12. The apparatus according to claim 10 further including a switch unit integrally formed with said single construction, said switch unit including at least one electrical switch for actuating an associated electrical device.

13. The apparatus according to claim 9 wherein:
    the associated handlebar defines a handlebar longitudinal axis;
    said hand grip portion of the apparatus defines a second longitudinal axis; and,
    the handlebar longitudinal axis is coincident with said second longitudinal axis.

14. The apparatus according to claim 9 wherein:
said hand grip portion defines a second longitudinal axis; and,
the first longitudinal axis of the master cylinder unit is coincident with said handlebar longitudinal axis and said second longitudinal axis.

15. The apparatus according to claim 9 wherein said trigger member is pivotable about an axis substantially perpendicular to said first longitudinal axis.

16. The apparatus according to claim 9 wherein said connection interface includes an attachment area coincident with said first longitudinal axis for selective attachment to an associated hydraulic line member of the associated device.

17. An apparatus for use with an associated handlebar of an associated device, the associated handlebar defining a handlebar longitudinal axis, the apparatus comprising:
a connection interface for selectively connecting the apparatus with the associated handlebar of the associated device;
a master cylinder unit having an elongate bore defining a first longitudinal axis;
a piston disposed within said bore and slidable relative to said master cylinder unit along said first longitudinal axis;
a trigger member pivotable relative to said master cylinder unit, the trigger member being adapted on a first end to receive an actuation force and on a second end to cause relative movement between said master cylinder unit and said piston in response to said actuation force; and,
a hand grip portion extending along said first longitudinal axis, said hand grip portion defining a second longitudinal axis, the first longitudinal axis of the master cylinder unit being coincident with said handlebar longitudinal axis and said second longitudinal axis.

18. The apparatus according to claim 17 wherein the connection interface, master cylinder unit, and handlebar portion are integrally formed in a single construction.

19. The apparatus according to claim 18 wherein said handlebar portion extends along said first longitudinal axis from said single construction on a side of said master cylinder unit opposite from said connection interface.

20. The apparatus according to claim 18 further including a switch unit integrally formed with said single construction, said switch unit including at least one electrical switch for actuating an associated electrical device.

21. The apparatus according to claim 17 wherein said trigger member is pivotable about an axis substantially perpendicular to said first longitudinal axis.

22. The apparatus according to claim 17 wherein said connection interface includes an attachment area coincident with said first longitudinal axis for selective attachment to an associated hydraulic line member of the associated device.

23. An apparatus comprising:
an elongate handlebar defining a longitudinal axis and having a manually grippable distal end;
a master cylinder including a piston movable relative to said handlebar along said longitudinal axis, said piston being contained within a cylindrical bore formed in said master cylinder, the cylindrical bore defining a second longitudinal axis, said first longitudinal axis of said handle bar being coincident with said second longitudinal axis of said bore, and;
an actuator adapted to cause relative motion between said piston and said master cylinder to actuate said master cylinder in response to application of an associated external force.

24. The apparatus according to claim 23 wherein said elongate handlebar and master cylinder are integrally formed as a single construction.

25. The apparatus according to claim 24 wherein said actuator is pivotably attached to said single construction, the actuator being pivotable relative to said single construction along an axis substantially perpendicular to said longitudinal axis.

26. The apparatus according to claim 25 further including a switch unit on said single construction, said switch unit being adapted to mount at least one associated electrical switch device.

27. An apparatus comprising:
an elongate handlebar defining a first longitudinal axis and having a manually grippable distal end;
a master cylinder including a piston movable relative to said handlebar along a second longitudinal axis in substantial coaxial alignment with said first longitudinal axis; and,
an actuator adapted to cause relative motion between said piston and said master cylinder to actuate said master cylinder in response to application of an associated external force.

28. The apparatus according to claim 27 wherein said elongate handlebar and master cylinder are integrally formed as a single construction.

29. The apparatus according to claim 28 wherein said actuator is pivotably attached to said single construction, the actuator being pivotable relative to said single construction along an axis substantially perpendicular to said longitudinal axis.

30. The apparatus according to claim 29 further including a switch unit on said single construction, said switch unit being adapted to mount at least one associated electrical switch device.

31. An apparatus for use with an associated handlebar of an associated device, the associated handlebar defining a handlebar longitudinal axis, the device comprising:
a main body member;
a connection interface on one end of said main body member for selectively connecting the apparatus with the associated handlebar of the associated device;
a master cylinder unit integrally formed with said main body member, the master cylinder unit having an elongate bore defining a first longitudinal axis, said first longitudinal axis of said master cylinder unit being coincident with said handlebar longitudinal axis;
a piston disposed within said bore and slidable relative to said master cylinder unit along said first longitudinal axis;
an actuator adapted to receive an actuation force from an associated external source and to cause relative movement between the master cylinder unit and said piston in response to said actuation force; and,
a hand grip portion integrally formed with said main body member and extending along said first longitudinal axis.

32. The integrated apparatus according to claim 31 further including a switch housing on said main body member, the switch housing being adapted to mount at least one associated electrical switch device relative to the main body member.

33. The integrated apparatus according to claim 31 wherein said connection interface includes a connection area defining a connection area axis coincident with said first longitudinal axis, said connection area being adapted for selective connection to an associated hydraulic line member of the associated device.

34. An apparatus for use with an associated handlebar of an associated device, the associated handlebar defining a first longitudinal axis, the apparatus comprising:

a main body member;

a connection interface on one end of said main body member for selectively connecting the apparatus with the associated handlebar of the associated device;

a master cylinder unit integrally formed with said main body member, the master cylinder unit having an elongate bore defining a second longitudinal axis coaxial with said first longitudinal axis;

a piston disposed within said bore and slidable relative to said master cylinder unit along said second longitudinal axis; and, an actuator adapted to receive an actuation force from an associated external source and to cause relative movement between the master cylinder unit and said piston in response to said actuation force.

35. The integrated apparatus according to claim 34 further including a switch housing on said main body member, the switch housing being adapted to mount at least one associated electrical switch device relative to the main body member.

36. The integrated apparatus according to claim 34 wherein said connection interface includes a connection area defining a connection area axis coincident with said first longitudinal axis, said connection area being adapted for selective connection to an associated hydraulic member of the associated device.

37. The integrated apparatus according to claim 34 further including a switch housing on said main body member, the switch housing being adapted to mount at least one associated electrical switch device relative to the main body member.

38. The integrated apparatus according to claim 34 wherein said connection interface includes a connection area defining a connection area axis coincident with said first longitudinal axis, said connection area being adapted for selective connection to an associated hydraulic line member of the associated device.

39. An apparatus for use with an associated handlebar of an associated device, the associated handlebar defining a handlebar longitudinal axis, the device comprising:

a main body member;

a connection interface on one end of said main body member for selectively connecting the apparatus with the associated handlebar of the associated device;

a master cylinder unit integrally formed with said main body member, the master cylinder unit having an elongate bore defining a first longitudinal axis;

a piston disposed within said bore and slidable relative to said master cylinder unit along said first longitudinal axis;

an actuator adapted to receive an actuation force from an associated external source and to cause relative movement between the master cylinder unit and said piston in response to said actuation force; and, a hand grip portion integrally formed with said main body member and extending along said first longitudinal axis, said hand grip portion of the apparatus defining a second longitudinal axis and the handlebar longitudinal axis being coincident with said second longitudinal axis.

40. The integrated apparatus according to claim 39 further including a switch housing on said main body member, the switch housing being adapted to mount at least one associated electrical switch device relative to the main body member.

41. The integrated apparatus according to claim 39 wherein said connection interface includes a connection area defining a connection area axis coincident with said first longitudinal axis, said connection area being adapted for selective connection to an associated hydraulic line member of the associated device.

42. An apparatus for use with an associated handlebar of an associated device, the associated handlebar defining a handlebar longitudinal axis, the device comprising:

a main body member;

a connection interface on one end of said main body member for selectively connecting the apparatus with the associated handlebar of the associated device;

a master cylinder unit integrally formed with said main body member, the master cylinder unit having an elongate bore defining a first longitudinal axis;

a piston disposed within said bore and slidable relative to said master cylinder unit along said first longitudinal axis;

an actuator adapted to receive an actuation force from an associated external source and to cause relative movement between the master cylinder unit and said piston in response to said actuation force; and, a hand grip portion integrally formed with said main body member and extending along said first longitudinal axis, said hand grip portion defining a second longitudinal axis, the first longitudinal axis of the master cylinder unit being coincident with said handlebar longitudinal axis and said second longitudinal axis.

43. The integrated apparatus according to claim 42 further including a switch housing on said main body member, the switch housing being adapted to mount at least one associated electrical switch device relative to the main body member.

44. The integrated apparatus according to claim 42 wherein said connection interface includes a connection area defining a connection area axis coincident with said first longitudinal axis, said connection area being adapted for selective connection to an associated hydraulic line member of the associated device.

* * * * *